United States Patent [19]
Mundt

[11] Patent Number: 6,007,282
[45] Date of Patent: Dec. 28, 1999

[54] CARGO-RESTRAINING DEVICE

[76] Inventor: John H. Mundt, 1512 Kingsfield Dr., Modesto, Calif. 95350

[21] Appl. No.: 09/201,990

[22] Filed: Dec. 1, 1998

Related U.S. Application Data

[62] Division of application No. 08/321,247, Oct. 11, 1994, Pat. No. 5,655,863, and a continuation of application No. 08/911,431, Aug. 10, 1997, abandoned.

[51] Int. Cl.⁶ .............................. B60P 7/08; B60P 7/135
[52] U.S. Cl. .............................. 410/94; 410/90; 410/121
[58] Field of Search .............................. 410/94, 95, 121, 410/155, 153, 156, 117, 90; 296/39.2; 188/32

[56] References Cited

U.S. PATENT DOCUMENTS

| | | | |
|---|---|---|---|
| 999,828 | 8/1911 | McNaugthon | 410/94 |
| 2,812,728 | 11/1957 | Reheis | 410/121 |
| 3,104,085 | 9/1963 | Skladary | 410/121 X |
| 3,508,764 | 4/1970 | Donrum et al. | 410/90 |
| 3,577,933 | 5/1971 | Ferris et al. | 410/94 |
| 3,861,541 | 1/1975 | Taft et al. | 410/90 X |
| 4,047,749 | 9/1977 | Lumbitz et al. | 410/90 X |
| 4,311,420 | 1/1982 | Hendricks et al. | 410/153 X |
| 4,955,771 | 9/1990 | Bott | 410/94 |
| 5,131,709 | 7/1992 | Spica | 296/392 |
| 5,549,428 | 8/1996 | Yeatts | 410/94 |
| 5,655,863 | 8/1997 | Mundt | 410/94 |

*Primary Examiner*—Stephen T. Gordon
*Attorney, Agent, or Firm*—J. L. Bohan

[57] ABSTRACT

A cargo restraining device for use in grooved truck beds, especially for use with grooved bed liners commonly used in pick up trucks. The restraining device includes a lower portion which protrudes downwardly into the grooves of the truck bed and an upper portion which is a platform member affixed to the downward protrusions. By placing the platform in a position to contact the cargo to be restrained and engaging the downward protrusions into the bed grooves, movement of the cargo will be inhibited. Additional verticality for the device can be achieved by making the platform thicker or by adding at least one vertical member. The downward protrusions can be designed to engage a variety of bed-liner-groove configurations.

2 Claims, 6 Drawing Sheets

CARGO-RESTRAINING DEVICE

RELATED APPLICATIONS

This application is a division of the patent application Ser. No. 08/321,247 entitled "CARGO-RESTRAINT DEVICE" filed on Oct. 11, 1994 by inventor, John H. Mundt, now U.S. Pat. No. 5,655,863, and a continuation of patent application Ser. No. 08/911,431 entitled "CARGO-RESTRAINT DEVICE" filed on Aug. 10, 1997 by inventor, John H. Mundt and now abandoned.

FIELD OF INVENTION

This invention relates to a device which will hold cargo in place during transport and, more particularly, to a device which will inhibit or block the movement of cargo being carried on a grooved, cargo-supporting surface such as the molded plastic liners used in truck cargo beds.

BACKGROUND OF THE INVENTION

The floor or bed of a truck, such as a pick-up or van, has a cargo-bearing surface which is typically designed to allow the cargo being hauled to be slid or rolled across the surface to facilitate loading. The cargo-bearing surface or floor is often made of metal and is embossed or provided with grooves in order to improve the rigidity of the floor for the given thickness of the metal. Trucks of the pick-up style are commonly provided with molded plastic liners to protect the metal bed from the elements and inadvertent damage during cargo loading, hauling and unloading. Because of the plastic composition of these bed liners, cargo is typically even more prone to sliding about than on the original metal bed. Rubber has been added to the plastic in order to increase the coefficient of friction of the cargo bearing surface of the liner. Also rubber mats are used under the cargo in order to inhibit cargo movement during transit. With many loads it is necessary to use ropes to secure the cargo in place which is time consuming and often difficult to accomplish effectively because the tie downs are too high or outside the truck bed or in a location, even if within the truck bed, that is difficult to use.

The most commonly used plastic, protective liners have fairly deep grooves which run substantially parallel to one another and along the longitudinal axis of the truck. The device of the present invention is able to take advantage of this aspect of the bed liner design to hold cargo in place without the use of tie down ropes.

SUMMARY OF THE INVENTION

It is, therefore, a principle objective of the present invention to provide a device capable of blocking the movement of cargo in truck beds which have a cargo supporting surface that contains grooves, and is especially effective in restraining cargo being carried on molded plastic bed liners which are commonly used in pick-up trucks. This is accomplished by providing a blocking device with downwardly extending protrusions which frictionally engage a significant portion of the surface area of the grooved, cargo-bearing surface.

The various advantages and features of the present invention will become apparent from the following description and accompanying drawings.

BRIEF DESCRIPTION OF THE DRAWINGS

FIG. 3-1 is a top view of cargo being held in place with four FIG. 3 blocking members.

FIG. 3-2 is a top view of a watermelon being held in place with four FIG. 3 blocking members.

FIG. 4-1 is an end view of a platform with dowel-shaped, downward protrusions.

FIG. 4-2 is an end view of a platform with square-shaped, downward protrusions.

FIG. 4-3 is an end view of a platform with integrally molded downward protrusions.

DESCRIPTION OF THE ILLUSTRATIVE EMBODIMENTS

Figure 1:
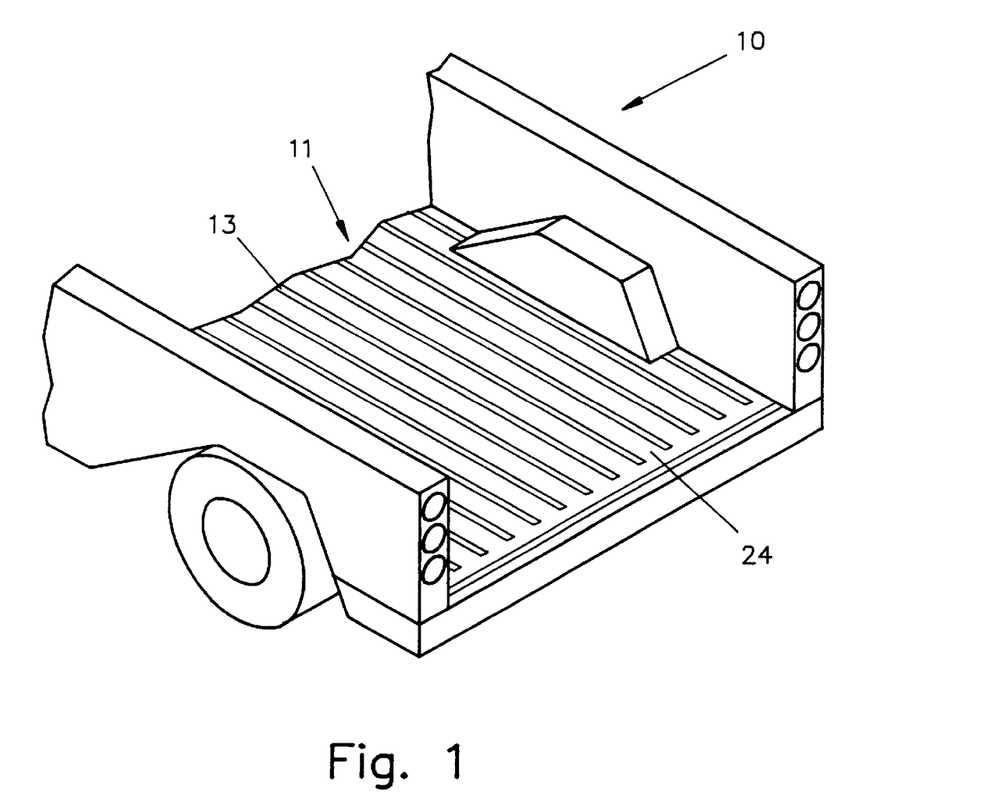
FIG. 1 is a perspective view of a pickup truck-bed showing the bed with a typical protective bed liner with grooves along the longitudinal axis of the truck.

FIG. 1 illustrates the truck bed portion 10 of a typical pick up truck containing a bed liner 11, commonly use for the purpose of protecting the metal bed of the truck from impact damage and the elements. The cargo-supporting surface 24 of the bed liner typically contains grooves or channels 13 which run substantially parallel to one another and in alignment with the longitudinal axis of the truck. These grooves tend to cushion the blow of dropped loads and provide ready movement of rainwater to the tailgate area for drainage.

Figure 2:
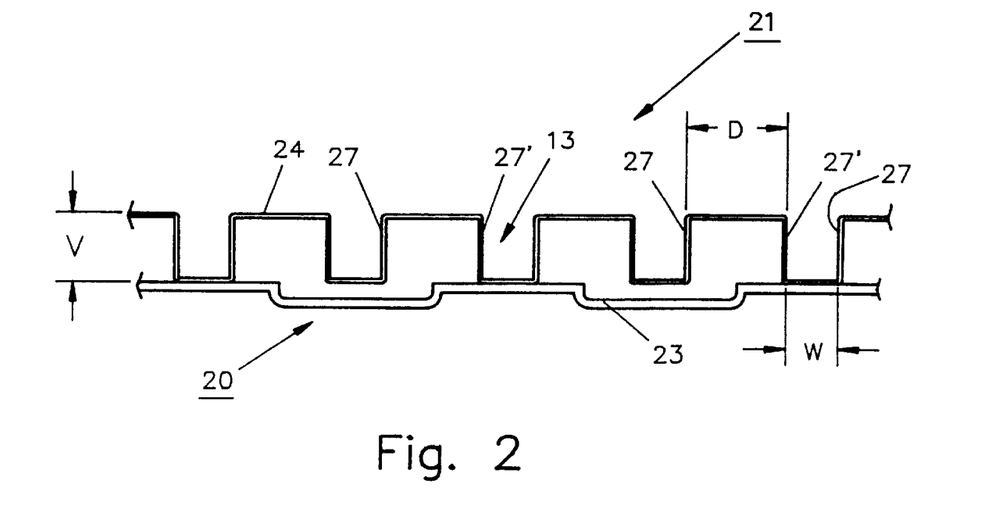
FIG. 2 is a partial cross-sectional view of the truck bed in FIG. 1.

FIG. 2 shows a partial transverse cross-section of the truck bed 20 made of sheet metal and the protective bed liner 21 resting on top of and in contact with the truck bed 20. The grooves 13 in the liner are usually somewhat deeper than the shallow channels 23 embossed in the sheet metal floor 20. For the most part the grooves in liners now being installed in pick up trucks are quite uniform in their construction. The peaks or plateaus 24 are comparatively flat and uniform along horizontal distance D from the edge of one groove 13 to another. Similarly the width W of the groove 13 from one wall 27 to the opposing wall 27' is quite uniform. A widely use bed liner for compact pick ups such as Toyota, Nissan, Ford, etc., has a plateaus 24 with a D dimension of approximately ⅝ of an inch and the groove width W also approximately ⅝ of an inch. Other brands of bed liners are very similar in construction but vary somewhat in dimensions D and W for the plateaus and grooves; some are slightly smaller, approximately ½ inch for both values and others somewhat larger in dimension D and/or dimension W. Four different bed liners having plateaus and grooves ranging from ½ inch to ¾ inch will account for a substantial percentage of the bed liners now being manufactured and installed.

Figure 3:
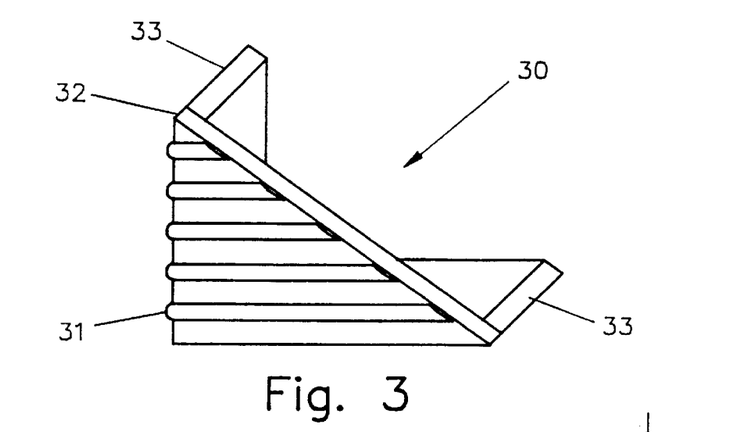
FIG. 3 is a perspective view of a cargo blocking member of the present invention viewed from the underside.
Figure 4:
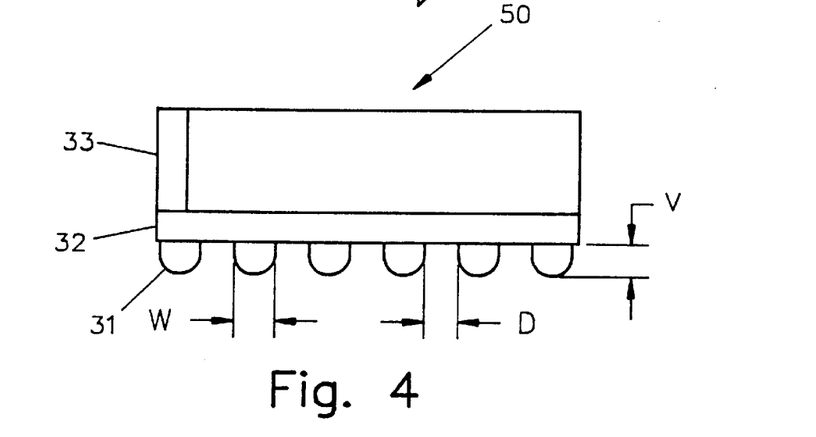
FIG. 4. is an end view of the blocking member shown in FIG. 3.

FIG. 3 depicts one type of blocking member or cargo restraint device 30 of the present invention. This device will restrain the movement of cargo of a large variety of sizes and shapes, especially when used in sets of two, three, four or more where the cargo is being transported on a bed liner as described above. Blocking member 30 is comprised of a first member 31 comprised of elongated protrusions which are space apart and affixed to the bottom of a second member 32. As shown in FIG. 4, these downwardly extending protrusions 31 have a width W which is substantially equal to the value W for the groove width shown in FIG. 2. In addition protrusions 31 are separated from one another by a distance D which is substantially equal to the plateau dimension D from side wall 27 to side wall 27' of the adjacent groove as shown in FIG. 2. The vertical dimension V of the protrusion 31 should be such that it substantially penetrates into the groove so that there is significant contact of protrusions 31 with the groove side walls 27 and 27' as shown in FIG. 2. The value for V can be adjusted to permit contact of the underside of platform 32 with the plateaus 24. Or V can be adjusted to minimize such platform contact and thereby cause the protrusions 31 to be compressed into grooves 13 so that when the protrusions are made of flexible material, weight on top of platform 32 will cause the protrusions 31 to fill the grooves 13 and effect an even greater gripping function. Bed liners are often provided with a mottled or dimpled surface that extends into the grooves and in such bed liners this design aspect of the invention may be emphasized.

The protrusions 31 in FIG. 4 are shown to be "U" shaped so as to fairly closely approximate the cross-sectional configuration of the grooves 13 in the bed liner. For ease of fabrication a rectangular or square cross-sectional configuration, as shown in FIG. 4-2, is suitable for the groove-engaging protrusions 41' provided the width W of such protrusions is such that substantial contact is made with the side walls of the grooves. By using the specific bed liner as a mold or model for a mold one can create such protuberances alone or together with the platform 32 which conform to the cross-section of the groove and plateau system of such bed liner. Such conforming-in-cross-section configuration is depicted as 41" in FIG. 4-3. Also satisfactory results have been achieved when the protrusion is a dowel-shaped configuration 41, as shown in FIG. 4-1, firmly affixed to or integral with the bottom of member 32.

The foregoing are exemplary of various cross-sectional configurations suitable for engaging the inside surfaces of the grooves in the bed liner and a variety of other configurations will suggest themselves to those skilled in the art. For example as a bed liner ages it often becomes somewhat compressed causing the bottoms of the grooves to flatten somewhat and causing the groove sidewalls to take on a dovetail configuration; that is, the groove is wider at the bottom than at the top. Protrusion made in a dovetail configuration and of pliable material, such as hard rubber, literally snap into the grooves and provide superior resistance to cargo movement. Bed liners can be made to intentionally have dovetail grooves; and blocking members of the present invention with dovetail protrusions that substantially match the cross-sectional geometry of such dovetail grooves in the bed liner will result in a superior cargo restraint system.

Figure 31:
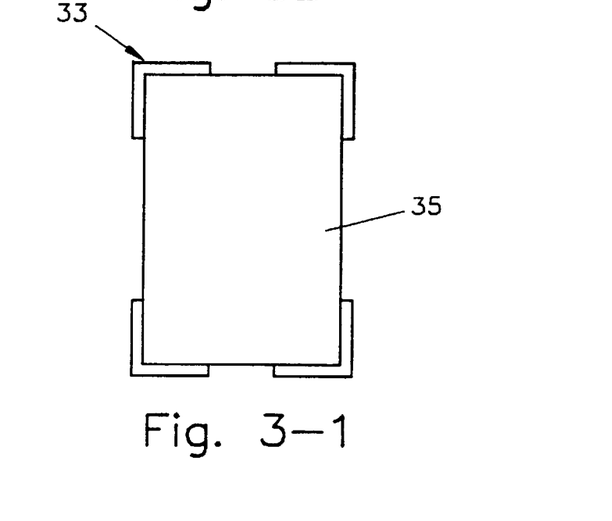
Figure 32:
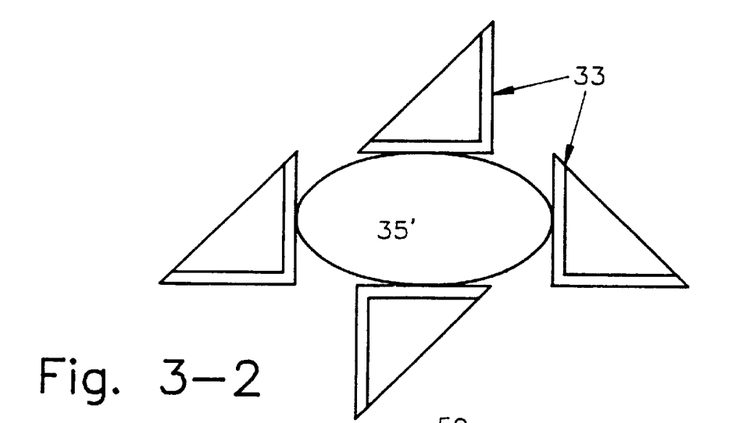
Figure 41:
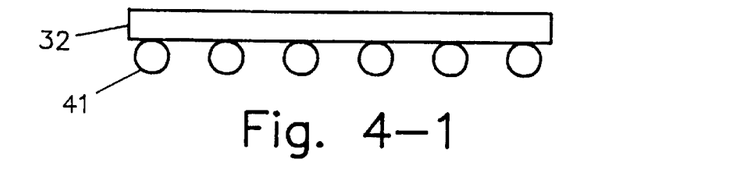
Figure 42:
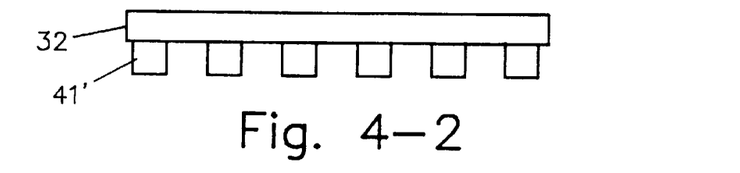
Figure 43:
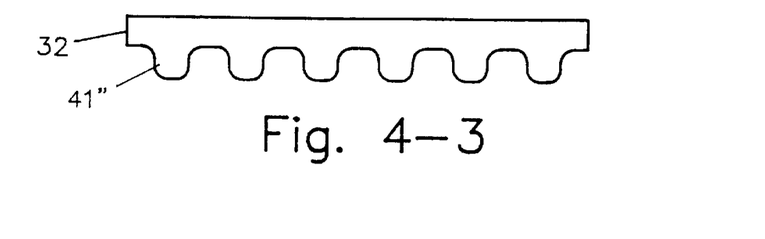

Four of the blocking members 30 of the design shown in FIG. 3 are shown in use in FIG. 3-1 to restrain the movement of box-shaped cargo 35, such as a heavy tool box, for transport on a bed liner. The two vertical members 33 extending from the top of the triangular-shaped platform 32 form a right angle which will allow the right angle corners of the box 35 to bear down on platform 32 and nestle in the corner created by vertical members 33; the weight of the cargo increases the frictional contact of the downward protrusions with the grooves and can also increases the friction of the underside of the platform with the plateaus of the cargo-bearing surface as well. Accordingly, the weight of the cargo itself enhances the restraining effect of the blocking member and further inhibits the box from movement in any horizontal direction. With vertical members 33 of a height of three to four inches even some vertical movement, such as may be experienced on a wash-board road, can occur and the cargo will still remain fixed in placed on the bed liner. These same four blocking members will find a wide range of applications for holding a variety of cargo-loads in place while being transported on a bed liner. As shown in FIG. 3-2, a watermelon 35' can be safely transported by placing the four blocking members 30 in the manner depicted in this figure.

Figure 3A:
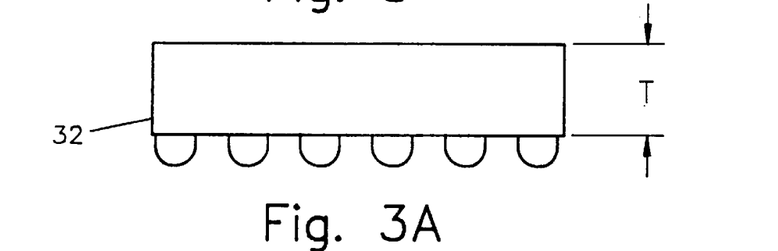
FIG. 3A is and end view of a blocking member of the present invention similar to that of FIG. 3 except with a thick platform.
Figure 3B:
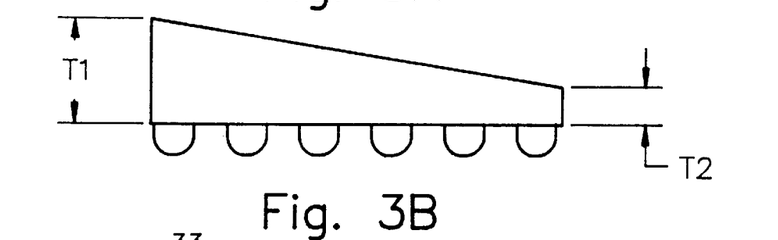
FIG. 3B is an end view of a blocking member of the present invention similar to that of FIG. 3A except that the platform is tapered.
Figure 5:
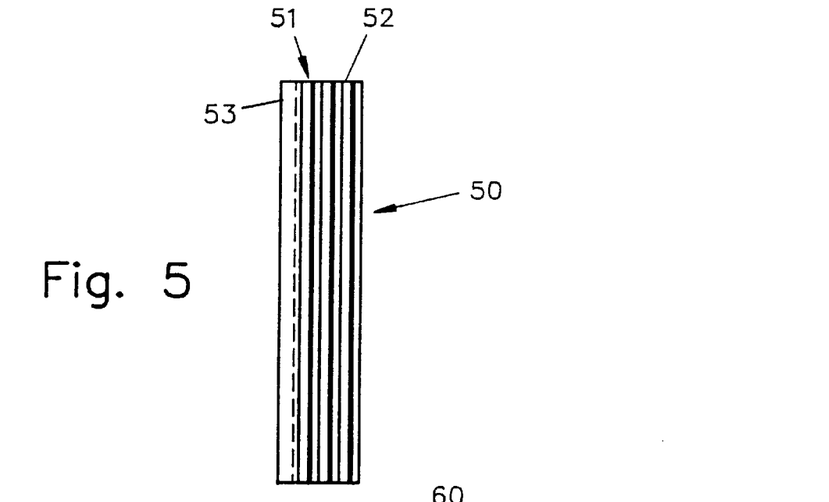
FIG. 5 is a bottom view of an elongated blocking member of the present invention.
Figure 6:
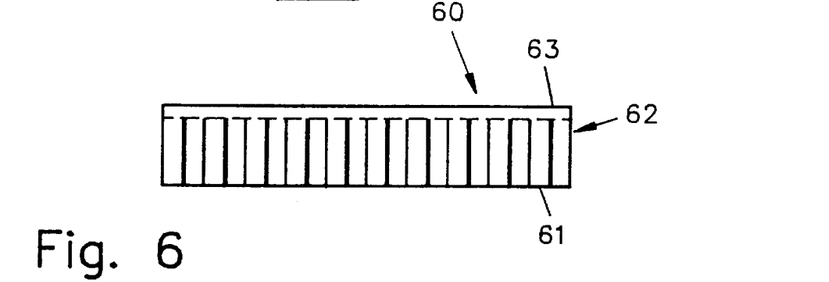
FIG. 6 is a bottom view of an alternative form of elongated blocking member.

Blocking devices employing the principles of the present invention may take on a wide variety of configurations to accommodate an almost endless array of payloads. As shown in FIG. 3A, the verticality needed to restrain cargo can be achieved simply by making the platform of greater thickness T; or, to conserve material, the platform may be tapered from thickness T1 to thickness T2 as shown FIG. 3B. A further variation is shown in FIG. 5, where platform member 52 may take the form of an elongated rectangle with the downward protrusion 51 extending longitudinally along the long axis of the platform 52 or, as depicted in FIG. 6, the protrusions 61 may extend transversely to the long axis of the rectangular platform 62. The FIG. 5 configuration is useful for holding elongated articles such a pipe between the truck sidewall or wheel well and the vertical member 53. It can also be use for the hauling of small items such as cans of paint in the area formed by the front and sidewalls of the truck bed, the wheel well and vertical member 53. If the truck has no wheel well, blocking member 50 may be used in combination with one or more blocking members 30 to create a secure area for cargo items. The FIG. 6 blocking member configuration 60 has application for wide, heavy loads where, for example, the front of the load is against the front wall of the truck bed and the rear of the load rests on platform 62 and is restrained from rearward movement by vertical member 63. Also this blocking member can be used to hold items, such as sacks of groceries, in place against the front wall of the truck bed.

Figure 7:
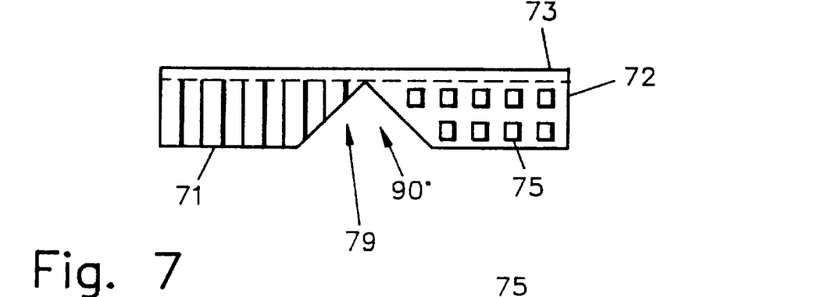
FIG. 7 is a bottom view of blocking member of the present invention which may be bent ninety degrees to conform to a corner for cargo restraint.

FIG. 7 shows a variation on the above elongated configuration which can be used as above or bent into an L-shape to conform to a cargo load. A large, ninety-degree notch 79 is taken out of the platform 72 at roughly the center of one long side. The notch penetrates only slightly or not at all into vertical member 73 to permit the unit to be bent ninety degrees into an L-shaped configuration. In order for the protrusions 75 to continue to engage the bed liner grooves, the protrusions must have gaps which are equal to the distance D across the top of the plateau; where the gaps have dimension D, the length of each segment of said protrusions 75 will have a length substantially equal to W so as to protrude into and engage the side walls of the grooves. Although FIG. 7 shows the left, under-side of platform 72 having continuous protrusions 71, the unit will have a wider range of use if protrusions 71 are also modified to form segmented protrusions 75.

Figure 8:
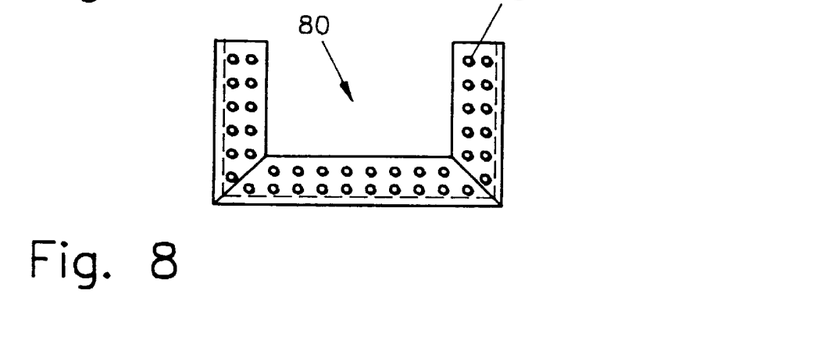
FIG. 8 is a bottom view of a blocking member of the present invention which may be bent into a U-shape.

As depicted in FIG. 8, when segmented protrusions 75 are used, more than one notch can be used to form different shapes such as a U-shape 80 or a square O shape.

Figure 9:
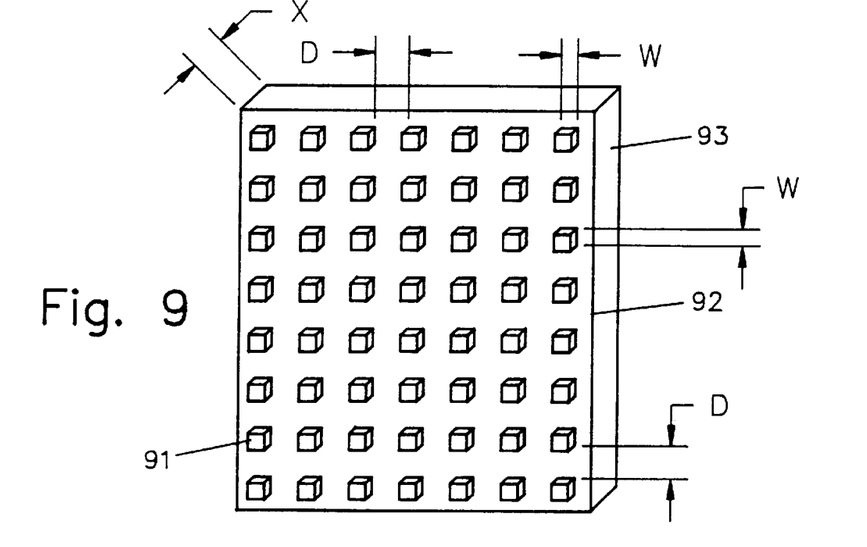
FIG. 9 is a bottom, perspective view of a blocking member of the present invention which can be used aligned longitudinally with the grooves or rotated ninety degrees and used to conform to the same groove configuration.
Figure 10:
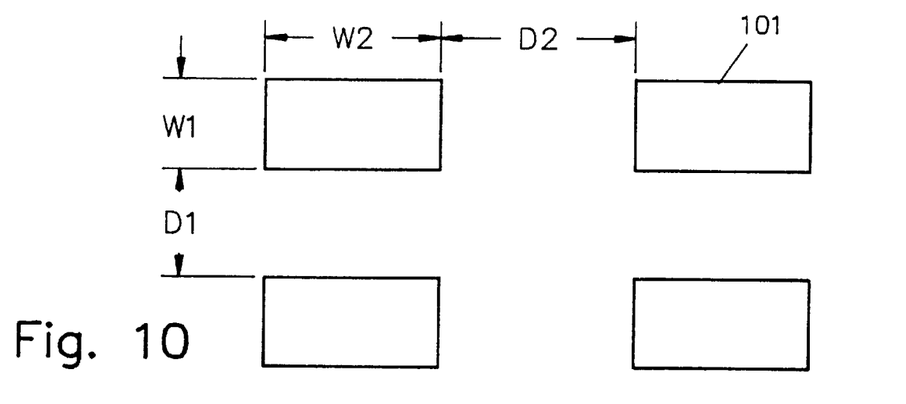
FIG. 10 is a bottom view of four protrusions to permit the blocking member to be designed to conform to two cargo beds each having a different groove configuration.

FIG. 9 depicts a platform 92 provided with a plurality of segmented protrusions 91 in a uniform pattern where the dimension of square shaped protrusions 91 are dimension W in both width and length and are of a depth substantially equal to or less that V, as shown in FIG. 2. The gaps or distances between immediately adjacent protrusions 91 are substantially equal to D. Platform 92 extends above the surface of the bed liner a distance of X by means of its thickness or by means of a vertical member 93 which will act to restrain the sliding movement of cargo. As indicated above, not all bed liners have the same dimensions for width W of the grooves and the distance D between the grooves. By changing the configuration of the protrusions 91 and gaps, one can cause the same blocking member work on two differently configured bed liners that have different values of D and W, by changing the configuration of the protrusions 91 and gaps. By way of illustration, assume the value for D and W in a first bed liner is ½ inch and the value for D and W in a second bed liner is ¾ inch. By changing the cross-sectional dimensions of protrusions from a square configuration 91 to a rectangular configuration 101 as shown in FIG. 10 and modifying the gaps as well, a single blocking member in one position may be used on the first bed liner having ½ inch values for D and W and by rotating the blocking member ninety degrees it may be used on the second bed liner having ¾ inch values for W and D. To achieve this effect, the value of ½ inch would apply to dimensions W1 and D1 and the value of ¾ inch would apply to dimensions W2 and D2 in FIG. 10.

Figure 11:
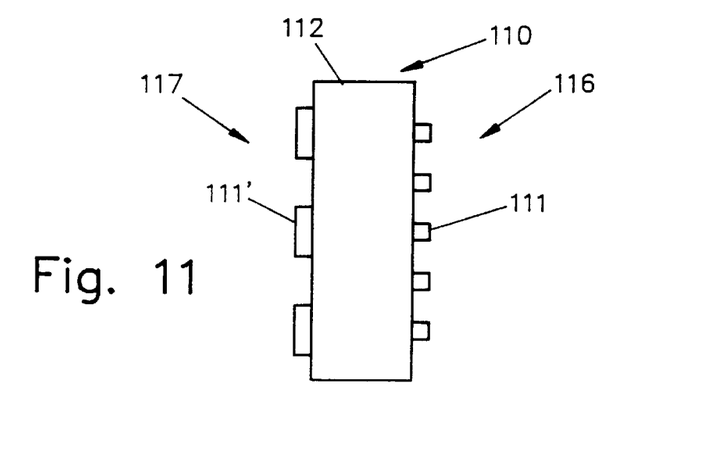
FIG. 11 is an end view of a blocking member which will restrain cargo in four different types of cargo beds, each with a different groove configuration from the others.

If the vertical elevation X of the platform 92 is achieved by simply making platform 92 of thickness X, a blocking member can be made to perform on bed liners of four different groove configurations. In blocking member 110 shown in FIG. 11, the first "bottom" 116 on platform 112 is provided with rectangular protrusions 111 in accordance with the configuration shown in FIG. 10. The second "bottom" 117 of blocking member 110 is provided with protrusions 111' which accommodate two additional bed liners with different values for D and W from each other and the aforementioned first "bottom" protrusions. By way of example, a third bed liner has a value of ⅞ inch for D and W and a fourth bed liner has a value of 1 inch for D and W. In this instance the protrusions 111' would have, in accordance with FIG. 10, a dimension of D1 and W1 of ⅞ and a value of 1 inch for D2 and W2. A blocking member so configured will permit its use, when inverted with "bottom" 117 downward, so that when in a first position its protrusions will engage the grooves in the third bed liner configuration and when rotated 90 degrees, engage the grooves in the fourth bed liner configuration.

The above values of ½ inch, ¾ inch, ⅞ inch and 1 inch were used in order to readily understand the principles of a blocking member configuration that will have utility for use with up to four bed liner configurations. The exact values will vary for dimensions D, W, D1, W1, D2 and W2 depending on the specific values for the bed liners for which it is designed. The same principles will apply for bed liners wherein the aforesaid dimensions are different: namely, where the value for the width of the groove is not the same as the distance between grooves.

Figure 12:
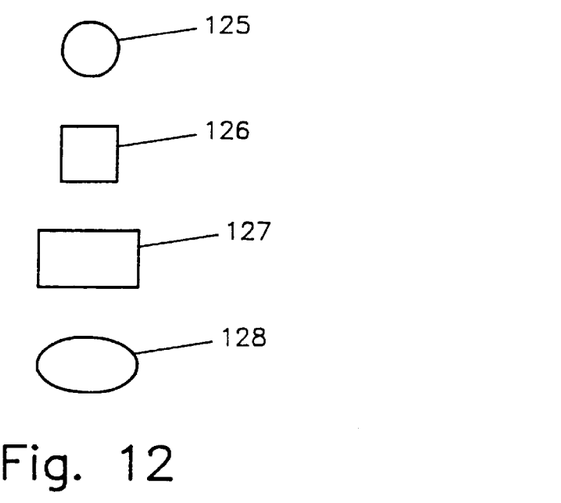
FIG. 12 is a bottom view of four different segmented protrusions each with a different geometry.

Although the protrusions 91 and 101 as shown in FIGS. 9 and 10 are square or rectangular in shape, they may be of other shapes as shown in FIG. 12. The protrusions may be circular 125, square 126, rectangular 127 or oval 128 so as to provide engagement with the side walls of the bed liner grooves. When the protrusions are made of a flexible material such as hard rubber, the segmented protrusions may be somewhat oversized with respect to the groove width, especially when the cargo will bear down on the blocking member platform.

Figure 13:
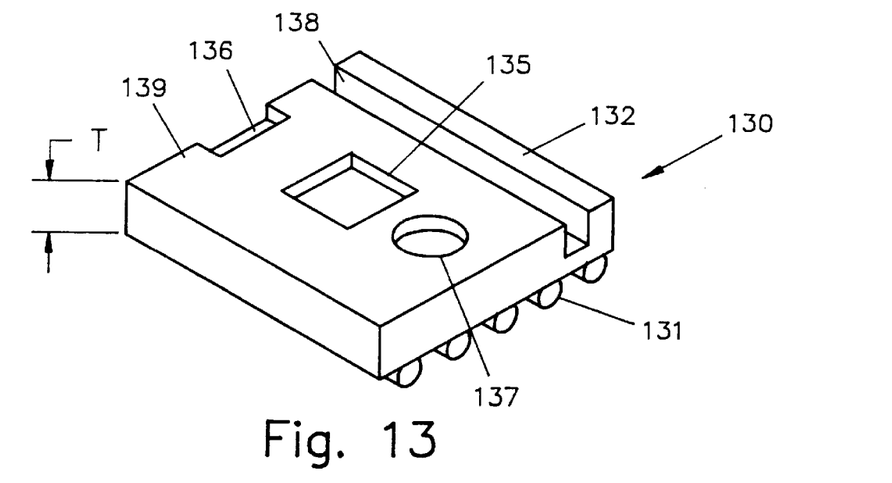
FIG. 13 is a perspective view of a blocking member of the present invention having different indentations in the top of the platform in order to accommodate a variety of cargo configurations.

The upper surface of the platform may be provided with a variety of indentations in order to accommodate the specific configuration of the cargo. Referring to FIG. 13, the blocking member 130 with downward protrusions 131 may be provided with sufficient thickness T in order to accommodate the indentation in the upper surface 139 of platform 132 as desired for the cargo in question. For a table or desk, the four legs may be placed in indentations such as 135 or 137 in four blocking members. The end of a rectangular cargo such as lumber may be placed in indentation 136; or an elongated cargo item such as a length of pipe may be accommodated by channel 138 to restrain its movement during transit.

Figure 14:
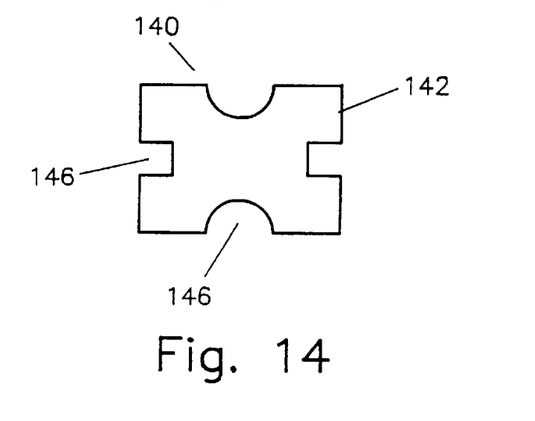
FIG. 14 is a top view of a blocking member of the present invention having different side indentation in the platform to accommodate certain types of cargo configurations.

FIG. 14 shows blocking member 140 with indentations 146 in the edges of the platform 142 to accommodate cargo with wheels, casters or other downward protrusions that bear on the cargo bearing surface of the truck bed.

Hard rubber has been referred to above as a suitable material for the blocking members of the present invention; however, a wide variety a materials or combination of materials may be used such as plastic, metal, wood or composite structures.

Having thus described the invention, it is understood that a wide variety of blocking member configurations may be used without departing from the spirit or scope of the following claims.

I claim:

1. In combination with the bed liner of a truck which bed liner contains a series of parallel grooves running lengthwise to the longitudinal axis of the truck which grooves have a predetermined depth and width, are uniformly spaced a predetermined distance from each other, and have substantially vertical side walls, a blocking device for restraining the movement of cargo placed on the bed liner comprising:

a first member for engaging at least two of said grooves in the bed liner which member is comprised of at least two elongated protrusions extending substantially vertically into and in physical conformance with the cross-sectional geometry of said grooves to degree sufficient to have substantial frictional contact with said grooves and said elongated protrusions extend in an elongated configuration for a predetermined distance in and along said grooves whereby the first member makes substantial frictional engagement with at least two of said grooves;

a second member which is a horizontal platform of rectangular configuration having an upper surface and a lower surface with one set of two opposing sides of the rectangular platform oriented substantially perpendicular to the grooves in said bed liner and a second set of two opposing sides oriented substantially parallel to the grooves in said bed liner which four sides of the rectangular, horizontal platform have a substantially vertical circumscribing edge wherein the first member is physically connected to the lower surface of said second member and is oriented so that the elongated protrusions are substantially parallel to the second set of opposing sides; and a third member having an inside vertical face and an outside vertical face located on the upper surface of said rectangular platform and parallel to and in alignment with the substantially vertical edge of one side of the second set of opposing sides of the second member so that said vertical edge of the second member and the outside vertical face of said third member form a continuous vertical surface whereby the inside face will grippingly engage the cargo which is restrained from movement by being placed on the upper surface of the second member of said blocking device in physical blocking contact with at least a portion of the inside vertical face of said third member and the weight of the cargo on the upper surface of the second member will add to the gripping engagement of the first member with the bed liner or, alternatively, by the cargo being placed directly on the bed liner in physical, blocking contact with the continuous vertical surface formed by the vertical edge of the second member that is in alignment with the outside vertical face of the third member.

2. A combination as in claim 1 wherein the first, second and third members of the blocking device are of integral construction.

\* \* \* \* \*